United States Patent
Becoulet et al.

(10) Patent No.: US 11,085,329 B2
(45) Date of Patent: Aug. 10, 2021

(54) AIRCRAFT TURBINE ENGINE WITH REDUCTION GEAR

(71) Applicant: SAFRAN AIRCRAFT ENGINES, Paris (FR)

(72) Inventors: Julien Fabien Patrick Becoulet, Moissy-Cramayel (FR); Xavier Jean Yves Alain Agneray, Moissy-Cramayel (FR); Michel Gilbert Roland Brault, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 44 days.

(21) Appl. No.: 16/580,823

(22) Filed: Sep. 24, 2019

(65) Prior Publication Data

US 2020/0095890 A1 Mar. 26, 2020

(30) Foreign Application Priority Data

Sep. 24, 2018 (FR) ...................................... 1858672

(51) Int. Cl.
*F01D 25/18* (2006.01)
*F01D 25/16* (2006.01)

(52) U.S. Cl.
CPC .............. *F01D 25/18* (2013.01); *F01D 25/16* (2013.01); *F05D 2220/323* (2013.01); *F05D 2230/60* (2013.01)

(58) Field of Classification Search
CPC .... F01D 25/18; F01D 25/16; F05D 2220/323; F05D 2230/60; F16C 27/045

(Continued)

(56) References Cited

U.S. PATENT DOCUMENTS 5,107,676 A * 4/1992 Hadaway ................ F01D 25/18
184/6.11
8,402,741 B1 * 3/2013 Merry ..................... F01D 25/16
60/226.1

(Continued)

FOREIGN PATENT DOCUMENTS

EP 3179056 A2 6/2017
FR 2987402 A1 8/2013

(Continued)

OTHER PUBLICATIONS

Search Report under Section 17(5) dated Feb. 24, 2020, issued in corresponding GB Application No. GB1913713.2, 3 pages.

(Continued)

*Primary Examiner* — Thai Ba Trieu
(74) *Attorney, Agent, or Firm* — Christensen O'Connor Johnson Kindness PLLC

(57) ABSTRACT

A turbine engine includes a fan. The fan includes a first shaft driven in rotation via a reduction gear, the first shaft being guided in rotation with respect to a support of a fixed structure via an upstream bearing and a downstream bearing, the downstream bearing guiding in rotation the first shaft with respect to a downstream branch of the support, the first shaft and the support together defining an enclosure. The reduction gear includes a ring gear fixed to the structure via a shell. The turbine engine also includes a lubricator composed of at least one pipe for conveying a liquid lubricant, wherein the pipe is located in the enclosure, the pipe passing through an orifice made in the shell and an opening made in the downstream branch.

11 Claims, 7 Drawing Sheets

(58) Field of Classification Search
USPC .......................................................... 415/229
See application file for complete search history.

(56) References Cited

U.S. PATENT DOCUMENTS

| | | | |
|---|---|---|---|
| 2012/0192570 A1 | 8/2012 | McCune et al. | |
| 2013/0004297 A1* | 1/2013 | Sheridan | F02C 7/36 |
| | | | 415/122.1 |
| 2014/0030088 A1 | 1/2014 | Coffin et al. | |
| 2015/0176493 A1* | 6/2015 | Munsell | F01D 25/16 |
| | | | 415/229 |
| 2015/0300255 A1 | 10/2015 | Gallet et al. | |
| 2017/0152756 A1* | 6/2017 | Schwarz | F01D 25/18 |
| 2017/0356452 A1* | 12/2017 | Mastro | F01D 25/18 |
| 2018/0038378 A1* | 2/2018 | DiBenedetto | F01D 25/164 |
| 2018/0051706 A1* | 2/2018 | DiBenedetto | F01D 25/18 |
| 2018/0335046 A1* | 11/2018 | Charier | F01D 25/18 |
| 2018/0335047 A1* | 11/2018 | Charier | F04D 29/362 |
| 2019/0085724 A1* | 3/2019 | Cuvillier | F01D 25/16 |
| 2019/0101081 A1* | 4/2019 | Cuvillier | F01D 25/18 |
| 2019/0153887 A1* | 5/2019 | Schwarz | F01D 25/18 |
| 2019/0170240 A1* | 6/2019 | Charrier | F01D 25/18 |
| 2019/0211709 A1* | 7/2019 | Sheridan | F01D 25/18 |
| 2019/0323597 A1* | 10/2019 | Sheridan | F01D 25/18 |
| 2019/0360578 A1* | 11/2019 | Chevillot | F01D 25/18 |
| 2020/0173302 A1* | 6/2020 | Munsell | F01D 25/16 |
| 2020/0309031 A1* | 10/2020 | Luck | F02C 7/06 |

FOREIGN PATENT DOCUMENTS

| | | | | |
|---|---|---|---|---|
| FR | 3075878 B1 | * 11/2019 | | F02C 7/36 |
| WO | 96/05412 A1 | 2/1996 | | |
| WO | 2013/124590 A1 | 8/2013 | | |

OTHER PUBLICATIONS

Rapport de Recherche Préliminaire, dated Jun. 13, 2019, issued in corresponding French Application No. 1858672, filed Sep. 24, 2018, 6 pages.

* cited by examiner

AIRCRAFT TURBINE ENGINE WITH REDUCTION GEAR

CROSS-REFERENCE TO RELATED APPLICATION

This application claims priority to French Application No. 1858672, filed on Sep. 24, 2018, the disclosure of which is incorporated herein in its entirety.

TECHNICAL FIELD

The present disclosure relates generally to a turbine engine with reduction gear for an aircraft.

BACKGROUND

A turbine engine, such as a bypass turbine engine, conventionally comprises an air inlet comprising a fan comprising blades supported by a shaft. The airflow generated by the fan is split into an airflow which enters into the engine and forms a hot flow (or primary flow), and into an airflow which flows around the engine and which forms a cold flow (or secondary flow).

The engine typically comprises, from upstream to downstream, in the direction of flow of the gases, at least one compressor, a combustion chamber, at least one turbine, and an exhaust nozzle, in which the combustion gases exiting from the turbine (primary flow) are mixed with the secondary flow.

A turbine engine can also be of the "two spool" type, which means that it comprises two rotors arranged axially. A first body is termed low-pressure body and a second body is termed high-pressure body. In a known manner, the engine comprises, in this case, from upstream to downstream, a low-pressure compressor, a high-pressure compressor, the combustion chamber, a high-pressure turbine and a low-pressure turbine.

In the case of a turbine engine with a reduction gear, the turbine shaft drives the fan shaft by way of a speed reduction gear which is lubricated and housed in an annular enclosure. The reduction gear makes it possible to reduce the rotation speed of the fan shaft with respect to that of the turbine shaft.

A planetary or epicyclic reduction gear each comprises at least one epicyclic train (comprising at least one sun gear, a planet carrier, planets and a ring gear) arranged according to a defined configuration. The epicyclic reduction gear will be more specifically covered below in the present application. An epicyclic reduction gear comprises a ring gear fixed to the structure via an annular shell and a planet carrier secured to the fan shaft, each planet thus having a mobile rotation axis.

The turbine shaft, which is the low-pressure turbine shaft in the case of a two-spool turbine engine, is generally coupled with a low-pressure compressor shaft which is itself coupled with an inlet shaft of the reduction gear. This inlet shaft is coupled in rotation with the sun gear of the reduction gear in order to drive it in rotation.

The fan shaft is, for example, guided in rotation with respect to an annular support of a fixed structure via an upstream bearing and a downstream bearing distant from one another and placed upstream of the speed reduction gear.

More specifically, the upstream and downstream bearings respectively guide the fan shaft in rotation, with respect to an upstream branch and a downstream branch of the support.

The fan shaft and the support together define the annular enclosure, wherein is housed in particular the speed reduction gear.

The turbine engine comprising means for lubricating the upstream and downstream bearings, the lubrication means comprising at least one pipe for conveying a liquid lubricant, such as oil.

It is known from document WO-A1-2013/124590 to install the pipe outside of the enclosure along the support. The pipe comprises a male nozzle housed in a female nozzle attached to the support, this connector being configured to convey the lubricant upstream of the upstream bearing, at the level of the sealing means placed between the fixed support and the mobile fan shaft.

The search for performance tends to reduce the radial volume of the turbine engine, and in particular the lubrication means. However, it is essential to maintain a method for easily and reliably mounting the turbine engine (and in particular, lubrication means).

The prior art further comprises documents EP-A2-3179056, US-A1-2014/030088 and WO-A1-96/05412.

The aim of the present disclosure is thus to propose a turbine engine having an optimised architecture making it possible to meet the abovementioned expectations.

SUMMARY

The disclosure proposes a turbine engine comprising a ducted fan comprising a first annular shaft supporting blades, the first shaft being driven in rotation via a speed reduction gear, the first shaft being guided in rotation with respect to an annular support of a fixed structure via an upstream bearing and a downstream bearing distanced from one another and placed upstream of the speed reduction gear, the downstream bearing guiding in rotation the first shaft with respect to a downstream branch of the support, the first shaft and the support together defining an annular enclosure, the speed reduction gear comprising a ring gear fixed to the structure via an annular shell, the turbine engine comprising means for lubricating the upstream and downstream bearings, the lubrication means comprising at least one pipe for conveying a liquid lubricant, characterised in that the pipe is located in the enclosure, the pipe passing through a orifice made in the shell and an opening made in the downstream branch.

The integration of the pipe in the enclosure makes it possible to significantly reduce the radial volume of the turbine engine, but also to avoid having lubricant leaks coming from the pipe outside of the enclosure. The orifice and the opening make it possible to pre-mount the pipe on one or more modules (or subassemblies) so as to benefit from an easy and reliable mounting of the pipe, and more generally, of the turbine engine.

The turbine engine according to the disclosure can comprise one or more of the following features, taken individually from one another or combined with one another:

the shell and the support each comprise an annular flange, the flange of the shell being arranged axially between the flange of the support and a collar of the structure, the flange of the support being fixed to the collar via at least one primary screw, the turbine engine comprising at least one secondary screw configured to fix the flange of the shell to the collar independently of the support;

the structure comprises an annular shield comprising a flange arranged axially between the flange of the support and the flange of the shell, the at least one secondary screw being configured to fix the flanges of the shield and of the shell to the collar independently of the support, the pipe passing through a space made in the shield, the space being arranged opposite the orifice;

the support comprises a mistake proofing element configured to angularly place the support such that the pipe is aligned with the orifice of the shell so as to make it possible to insert the pipe into the orifice during the mounting of the support;

the pipe comprises an outer section and an inner section, the outer section having an outer nozzle connected to a nozzle of a supply channel and an inner nozzle connected to an outer nozzle of a connector, the connector comprising a first lubricating spout of the downstream bearing, the inner section having an outer nozzle connected to an inner nozzle of the connector and an inner nozzle connected to a second spout for lubricating the upstream bearing;

the support comprises a nozzle attached to the structure, and an upstream branch and the downstream branch secured to the base, the upstream bearing guiding the first shaft with respect to the upstream branch of the support, the downstream branch being made integral with the base and the upstream branch being attached to the base; (first embodiment)

the support comprises at least one ventilation opening of the enclosure made in the downstream branch, the at least one opening being configured to make it possible for the passage of an endoscope or a visual inspection of an operator so as to verify the passage of the pipe in the orifice during the mounting of the support;

the support comprises a base attached to the structure, and an upstream branch and the downstream branch secured to the base, the upstream bearing guiding the first shaft with respect to the upstream branch of the support, the upstream and downstream branches being made integral with the base; (second embodiment)

the upstream and downstream bearings are rolling bearings, each comprising an outer ring housed in the upstream branch or the downstream branch, an inner ring attached to the first shaft and rolling elements arranged between the inner and outer rings, the inner ring of the downstream bearing being stopped axially by a shoulder made in the first shaft and by an annular spacer arranged between the inner ring of the downstream bearing and the inner ring of the upstream bearing, the inner ring of the upstream bearing being stopped axially by the spacer and removable axial holding means.

The disclosure has as a second object a method for mounting a turbine engine according to the first embodiment, characterised in that it chronologically comprises steps consisting of:
a) mounting, from upstream to downstream, a first module on an assembly during mounting, the assembly during mounting comprising at least one casing of the fixed structure and a second shaft, the first module comprising the speed reduction gear, on which have been pre-mounted, the first shaft and the shell,
b) mounting, from upstream to downstream, a second module comprising the base and the downstream branch of the support, on which have been pre-mounted, the outer section of the pipe and the downstream bearing,
c) mounting, from upstream to downstream, a third module comprising the upstream branch, on which have been pre-mounted, the inner section of the pipe and the upstream bearing.

The disclosure has as a third object a method for mounting a turbine engine according to the second embodiment, characterised in that it comprises a step of mounting, from upstream to downstream, a first module on an assembly during mounting, the assembly during mounting comprising at least one casing of the fixed structure and a second shaft, the first module comprising the speed reduction gear, the first shaft, the shell, the support, the pipe, the upstream bearing and the downstream bearing.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

Figure 1:
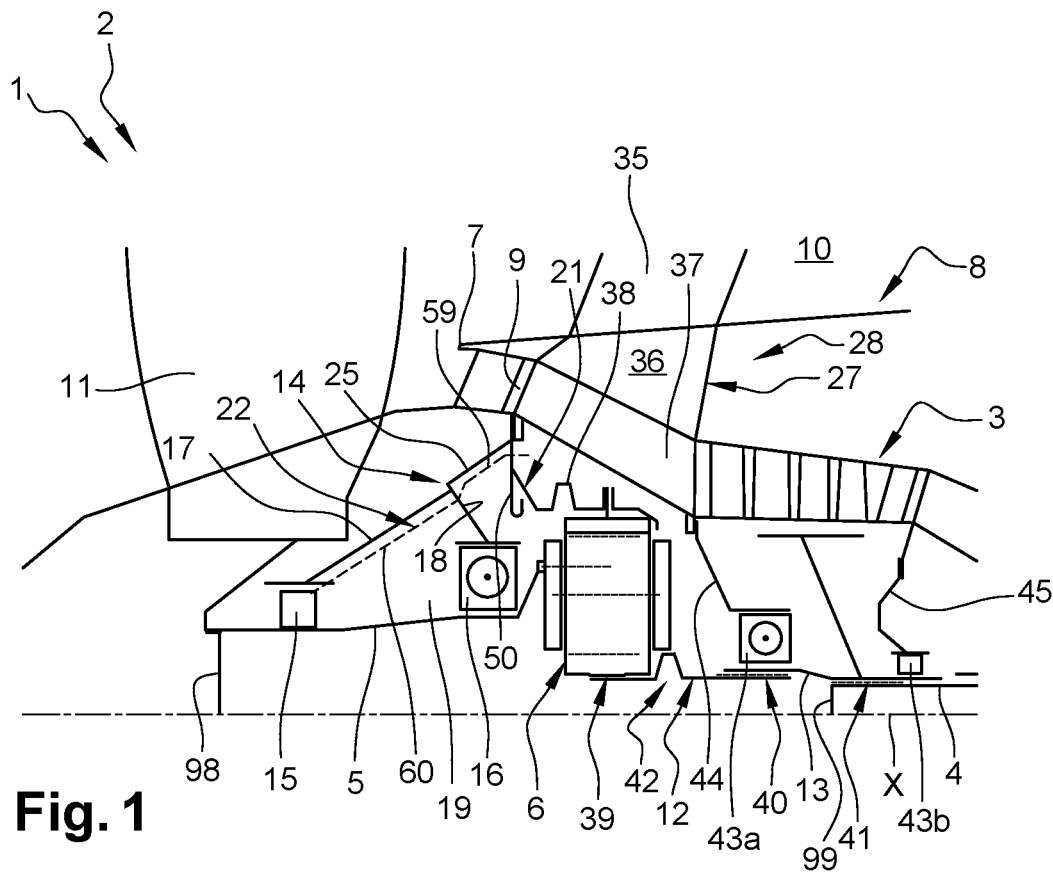
FIG. 1 is a schematic, axial half-cross-sectional view of an aircraft reduction gear turbine engine, partially represented, according to a first embodiment.

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

In FIGS. 1-3 and 5-7, a reduction gear turbine engine 1 is partially represented, which comprises, from upstream to downstream, in the direction of flow of the gases, a ducted fan 2 and an engine comprising a low-pressure compressor 3, a high-pressure compressor, a combustion chamber, a high-pressure turbine and a low-pressure turbine. The rotors of the high-pressure compressor and of the high-pressure turbine are connected by a high-pressure shaft and form with it a high-pressure (HP) body. The rotors of the low-pressure compressor 3 and of the low-pressure turbine are connected by a low-pressure shaft and form with it a low-pressure (LP) body. The shaft 5 of the fan 2 is driven by way of a speed reduction gear 6 by the shaft 4 of the low-pressure (LP) turbine.

By convention, in the present application, the terms "upstream" and "downstream" are defined with respect to the direction of circulation of the gases in the turbine engine 1. Likewise, by convention, in the present application, the terms "inner" and "outer", "internal" and "external" are defined radially with respect to the axis X of the turbine engine 1, which is in particular, the axis of rotation of the HP and LP shafts.

The airflow generated by the fan 2 is split, by a separating spout 7 of a fixed structure 8 of the turbine engine 1, into a primary airflow which enters into a primary duct 9 of the engine and a secondary airflow which flows around the engine in a secondary duct 10 and decisively contributes to the thrust provided by the turbine engine 1.

The ducted fan 2 comprises an annular fan shaft 5 (first shaft) supporting blades 11 and driven in rotation by an annular inlet shaft 12 (second shaft) via the speed reduction gear 6. The inlet shaft 12 is driven in rotation by the annular shaft 4 of the low-pressure (LP) turbine via the annular shaft 13 of the low-pressure (LP) compressor 3. The fan shaft 5, the inlet shaft 12, the LP compressor shaft 13 and the LP turbine shaft 4 have one same rotation axis, which is coaxial with the axis X of the turbine engine 1. In a variant, the LP turbine shaft 4 could, for example, drive directly in rotation the inlet shaft 12.

The fan shaft 5 is guided in rotation with respect to an annular support 14 of the fixed structure 8 via an upstream bearing 15 and a downstream bearing 16 distant from one another and placed upstream of the speed reduction gear 6. The downstream bearing 16 guides in rotation the fan shaft 5 with respect to a downstream branch 18 of the support 14. The fan shaft 5 and the support 14 together define an annular enclosure 19. The speed reduction gear 6 comprises a ring gear 20 fixed to the structure 8 via an annular shell 21. The turbine engine 1 comprises means for lubricating the upstream and downstream bearings 15, 16. The lubrication means comprise at least one pipe 22 for conveying a liquid lubricant, such as oil. The pipe 22 is located in the enclosure 19. The pipe 22 passes through an orifice 23 made in the shell 21 and an opening 24 made in the downstream branch 18.

According to the embodiments illustrated in the FIGURES, more specifically, the upstream and downstream bearings 15, 16, as well as the reduction gear 6, are housed in the enclosure 19, commonly termed "oil enclosure". The upstream and downstream bearings 15, 16 guide respectively in rotation the fan shaft 5 with respect to an upstream branch 17 and the downstream branch 18 of the support 14. The support 14 (centered on the axis X) comprises a base 25 attached to a collar 26 of an inner hub 27 of an inlet casing 28 of the fixed structure 8, as well as the upstream and downstream branches 17, 18 secured to the base 25. More specifically, such as illustrated in the FIGURES, the fan shaft 5 can flare from upstream to downstream. The upstream branch 17 and the base 25 can flare from upstream to downstream. The downstream branch 18 can flare from downstream to upstream.

The upstream bearing 15 is, for example, a rolling bearing (centered on the axis X) comprising an inner ring 29 mounted on the fan shaft 5 and an outer ring 30 housed in the upstream branch 17 of the support 14. The inner and outer rings 29, 30 define a rolling track for rolling elements 31 (here, cylindrical rollers). The upstream bearing 15 is thus capable of mainly supporting radial loads.

The downstream bearing 16 is, for example, a rolling bearing (centered on the axis X) which is axially placed downstream of the upstream bearing 15. The downstream bearing 16 comprises an inner ring 32 mounted on the fan shaft 5 and an outer ring 33 housed in the downstream branch 18 of the support 14. The inner and outer rings 32, 33 define a rolling track for rolling elements 34 (here, balls). The balls are in radial contact with the inner and outer rings 32, 33. The downstream bearing 16 is thus capable of supporting radial and axial loads.

The inlet casing 28 comprises the inner hub 27 and an outer ferrule (not represented) extending around the hub 27, the inner hub 27 and the outer ferrule being connected together by structural guiding blades 35 distributed regularly around the axis X, these guiding blades 35 are more known under the acronym OGV (Outlet Guide Vane). The ferrule and the hub 27 form a portion of the secondary duct 10. The inner hub 27 comprises an annular passage defining a portion of the primary duct 9. The portion of the secondary duct 10 is separated radially from the portion of the primary duct 9 by an inter-duct compartment 36 integrated in the structure 8. The hub 27 comprises a plurality of hollow arms 37 arranged in the passage (generally between four and twelve arms, preferably between six and eight arms), these arms 37 making it possible for the passage of the servitudes (and in particular, pipes for supplying liquid lubricant, such as fuel, oil or air, as well as electrical supply sheaths) from the inter-duct compartment 36 until the enclosure 19 while limiting the load losses in the primary duct 9. With respect to the guiding blades 35, the arms 37 generally have a larger main frame and a symmetrical profile.

The shell 21 (centered on the axis X) has an outer end attached to the collar 26 of the inlet casing 28 and an inner end restricted on the ring gear 20 of the reduction gear 6. The shell 21 comprises elastically deformable means 38 arranged between the inner end thereof and the outer end thereof. The elastically deformable means 38 are, for example, one or more gussets.

The reduction gear 6 is, for example, of the epicyclic type. The reduction gear 6 is housed and lubricated in the enclosure 19. The reduction gear 6 makes it possible to reduce the rotation speed of the fan shaft 5 with respect to that of the LP turbine shaft 4. The inlet shaft 12 is coupled in rotation to a sun gear of the reduction gear 6 via coupling means 39. The inlet shaft 12 is coupled in rotation with the LP compressor shaft 13 via coupling means 40 arranged downstream of the reduction gear 6, the LP compressor shaft 13 itself being coupled in rotation with the LP turbine shaft 4 via coupling means 41 arranged downstream of the inlet shaft 12. The reduction gear 6 further comprises planets supported by a planet carrier and each arranged between the sun and the fixed ring gear 20. The fan shaft 5 is connected in rotation to the planet carrier of the reduction gear 6, the planet carrier forming the outlet shaft of the reduction gear 6. The ring gear 20 is fixed to the collar 26 of the inlet casing 28 via the shell 21.

The inlet shaft 12 comprises elastically deformable means 42 arranged downstream of the reduction gear 6. The elastically deformable means 42 are, for example, one or more gussets and/or one or more flexible coupling devices known under the name, "flex coupling" and/or one or more flexible curvic coupling devices, known under the name, "flex-curvic coupling". The "flex-curvic coupling" device is presented in more detail in the patent application with the application number FR1763043 having a publication number FR 3075878 B1, the disclosure of which is incorporated by reference in its entirety.

The LP compressor shaft 13 is guided in rotation via an upstream bearing 43*a* and a downstream bearing 43*b* respectively with respect to an upstream support 44 and a downstream support 45 of the fixed structure 8. The upstream and downstream bearings 43*a*, 43*b* are placed downstream of the reduction gear 6. The upstream bearing 43*a* is housed in the enclosure 19. Advantageously, the upstream and downstream bearings 43*a*, 43*b* are respectively a ball bearing and a roller bearing. In a variant, the LP compressor shaft 13 could be guided in rotation via a single bearing, advantageously corresponding to a ball bearing.

The enclosure 19 (centered on the axis X) is delimited by fixed elements and mobile elements. More specifically, the fixed elements delimiting the enclosure 19 are the support 14 (more specifically, the upstream branch 17 and the base 25), the inner hub 27 and the upstream support 44. The mobile elements delimiting the enclosure 19 are in particular an upstream cap 98, an upstream portion of the fan shaft 5, a median portion of the LP compressor shaft 13 and a downstream cap 99. Sealing means (not represented) are provided between the fixed and mobile elements, and are for example labyrinth seals, brush seals, segmented radial seals, etc. The sealing means are pressurised via an air circuit (not represented) in order to avoid the lubricant leaks coming from the enclosure 19. This air circuit thus makes it possible to ventilate and pressurise the enclosure 19 at the terminals of the upstream bearings 15, 43*a*. The upstream cap 98 (or stopper) is placed in the fan shaft 5 at the level of the upstream end thereof, so as to close the enclosure 19 upstream in a sealing manner. The downstream cap 99 is placed in the LP turbine shaft 4 at the level of the upstream end thereof, so as to close the enclosure 19 downstream in a sealing manner.

Figure 3:
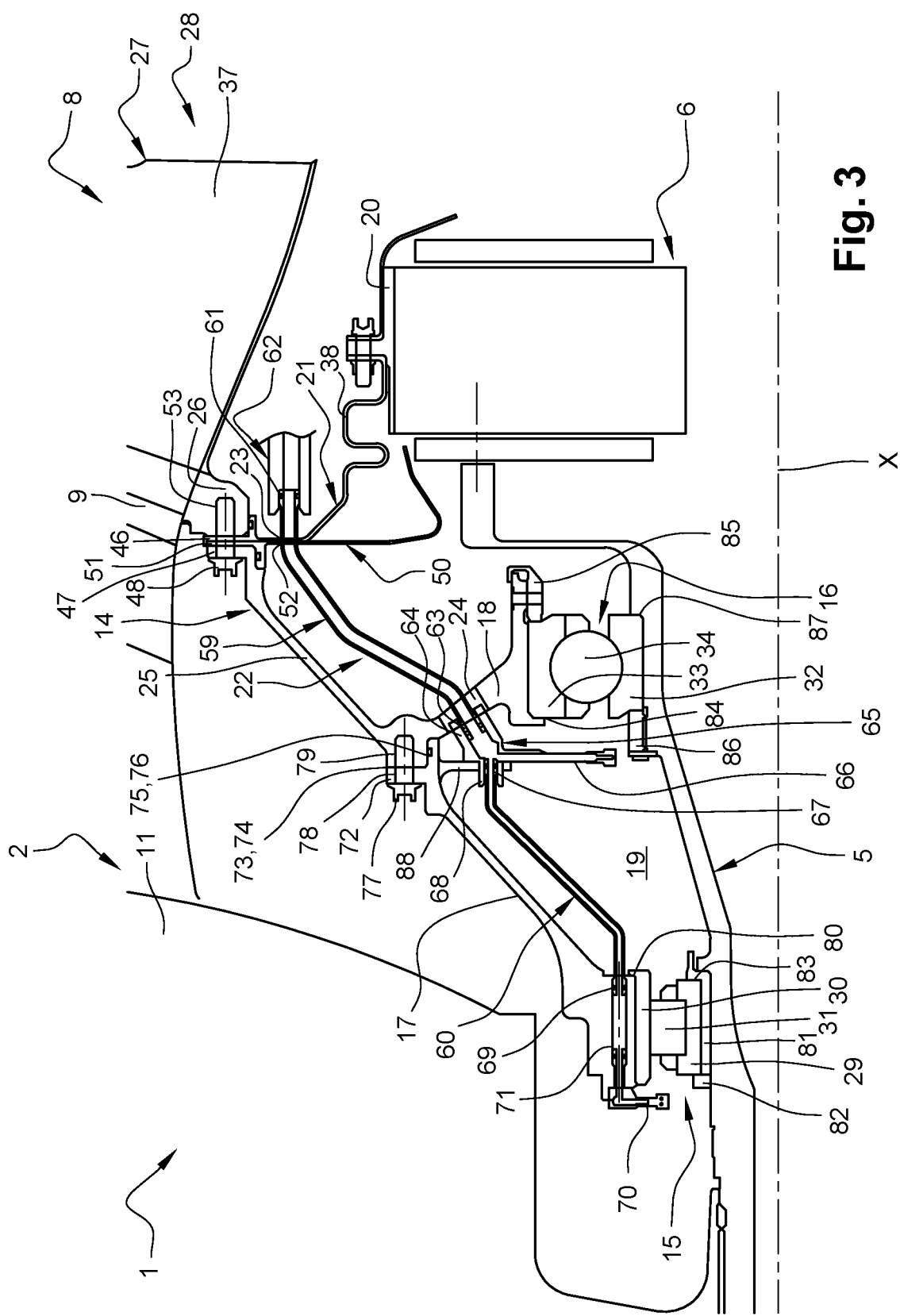
FIG. 3 is an axial, half-cross-sectional view of a concrete example of the first embodiment.
Figure 7:
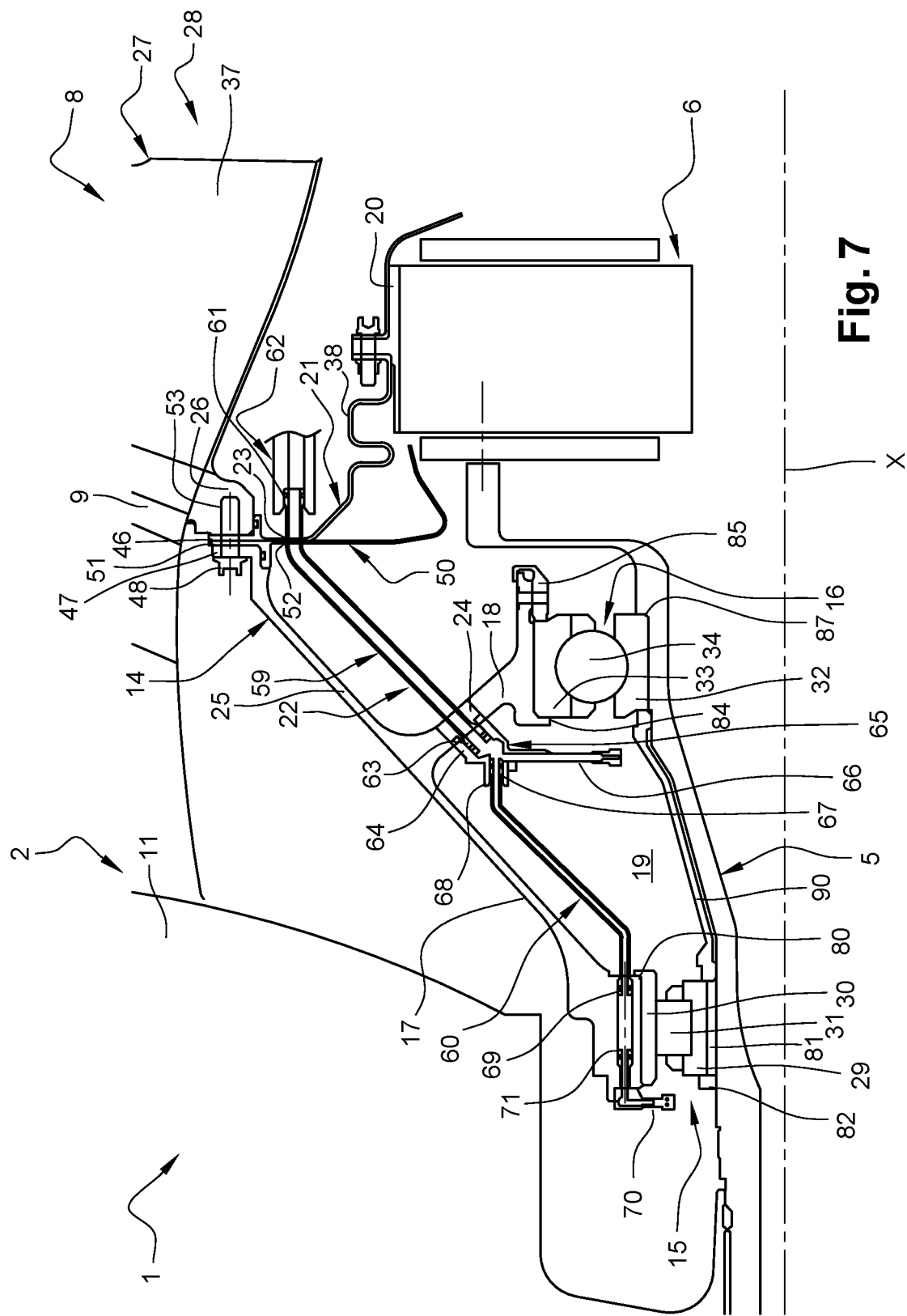
FIG. 7 is a detailed, axial half-cross-sectional view of a concrete example of the second embodiment.

Such as illustrated in FIGS. 3 and 7, more specifically, the shell 21 and the support 14 each comprise an annular flange 46, 47 (centered on X). The flange 47 of the support 14 is arranged at an outer end of the base 25. The flange 46 of the shell 21 is arranged at the outer end thereof. The flange 46 of the shell 21 is arranged axially between the flange 47 of the base 25 and the collar 26 of the inlet casing 28. The flange 47 of the base 25 is fixed to the collar 26 via at least one primary screw 48, 57. The turbine engine 1 comprises at least one secondary screw 49, 58 configured to fix the flange 46 of the shell 21 to the collar 26 independently of the support 14 (and in particular of the base 25).

According to the embodiments illustrated in the FIGURES, the structure 8 further comprises an annular shield 50 (centered on the axis X) comprising a flange 51 arranged axially between the flange 47 of the base 25 and the flange 46 of the shell 21. The flange 51 of the shield 50 is arranged at the outer end. The shield 50 has an "L" shape in the cross-section and makes it possible to guide the lubricant inside the enclosure 19, by limiting the lubricant projections in the direction of the downstream bearing 16. The secondary screw(s) 49, 58 are configured to fix the flanges 51, 46 of the shield 50 and of the shell 21 to the collar 26 independently of the support 14. The pipe 22 furthermore passes through a space 52 made in the shield 50, the space 52 being arranged opposite the orifice 23 made in the shell 21.

In a variant, the shield 50 could be attached to the shell 21 via fixing means such as bolts and/or rivets.

For reasons of clarity, the shield 50 is not represented in FIGS. 8 to 11. It is also noted, that the support 14 is represented partially in these FIGURES.

As illustrated in FIGS. 3 and 7, the flange 46 of the shell 21 is centered and supported with respect to the collar 26 of the inlet casing 28. The flange 51 of the shield 50 is centered and supported with respect to the flange 46 of the shell 21. The flange 47 of the base 25 is centered and supported with respect to the flange 51 of the shield 50. The positioning of the flange 46 of the shell 21 opposite the collar 26 of the inlet casing 28 (via a supporting surface and a centering surface) is formed by a plane-supporting connection and a short centering. Such a positioning is also used to position the flange 51 of the shield 50 opposite the flange 46 of the shell 21, as well as to position the flange 47 of the base 25 opposite the flange 51 of the shield 50. The flanges 46 of the shell 21 and of the shield 50 each comprise an O-ring placed in a groove.

As shown in FIGS. 8 to 11, the flange 47 of the base 25 is fixed to the collar 26 via a plurality of primary screws 48, 57 distributed around the axis X. The rod of each primary screw 48, 57 simultaneously passes through a through hole made in the flange 47 of the base 25, a through hole made in the flange 51 of the shield 50, a through hole made in the flange 46 of the shell 21 and a tapped hole 53 made in the collar 26. The primary screws 48, 57 are, for example, screws having a hex cylindrical head.

More specifically, the flange 47 of the base 25 comprises a ridge 54 between two adjacent primary screws (or between a primary screw and a secondary screw) so as to form a reinforcement 55, wherein is located the head of the corresponding screw.

The flanges 51, 46 of the shield 50 and of the shell 21 are fixed to the collar 26 independently of the support 14 via a plurality of secondary screws 49, 58, for example, three. The rod of each secondary screw 49, 58 simultaneously passes through a through hole made in the flange 51 of the shield 50, a through hole made in the flange 46 of the shell 21 and a tapped hole 53 made in the collar 26. The secondary screws 49, 58 make it possible, for example, to hold in place the shield 50 and the shell 21 during the demounting of the support 14 (and, in particular, the base 25 of the support 14).

The support 14 comprises a mistake proofing element configured to angularly place the support 14 such that the pipe 22 is aligned with the orifice 23 of the shell 21 and the space 52 of the shield 50 so as to make it possible to insert the pipe 22 in the orifice 23 of the shell 21 and the space 52 of the shield 50 during the mounting of the support 14 (and, in particular, of the base 25).

Figure 8:
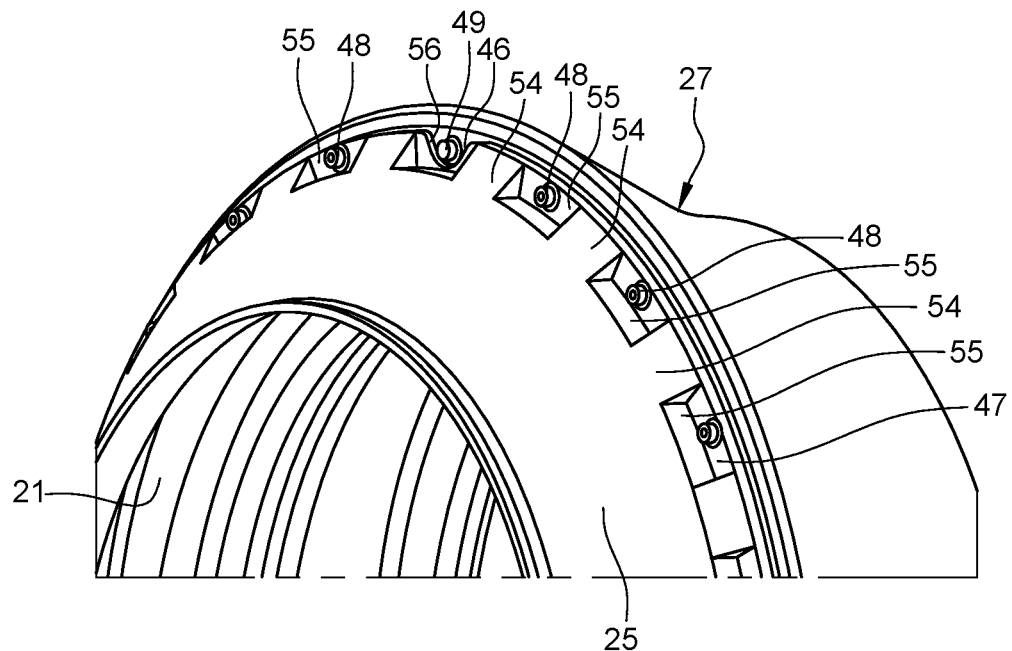
FIG. 8 is a detailed, perspective view of the assembly of a base and a shell on a collar, according to the first and second embodiments.
Figure 9:
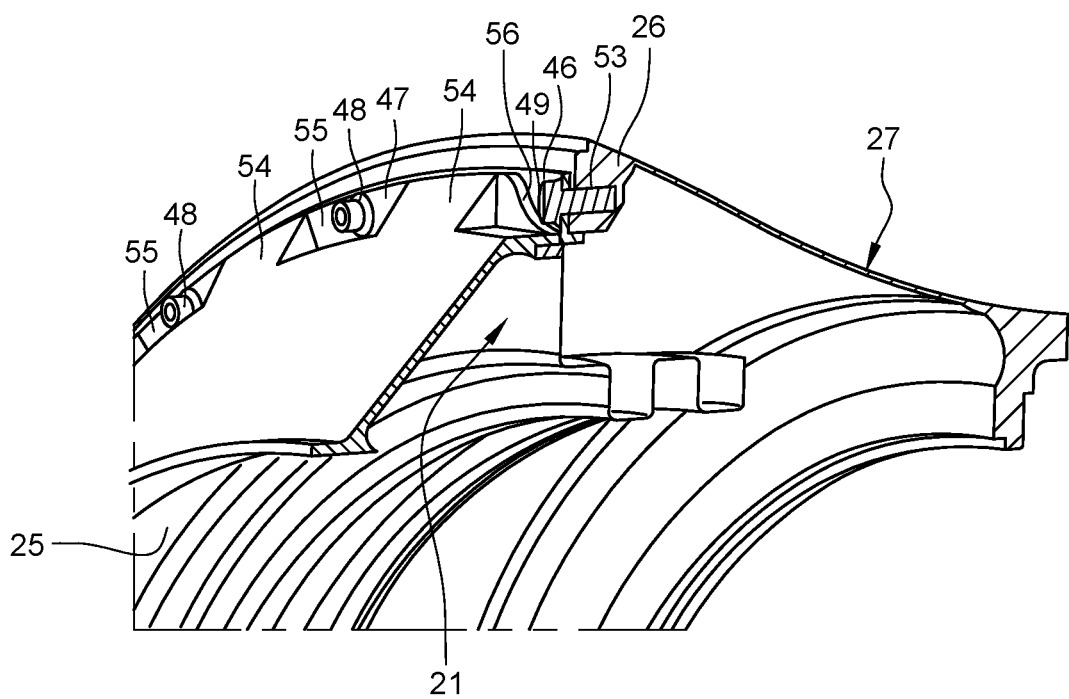
FIG. 9 is a perspective, axial half-cross-sectional view of the assembly of FIG. 8.

As illustrated in FIGS. 8 and 9, the primary and secondary screws 48, 49 are distributed around the axis X according to a constant angular step, for example 10 degrees. At the level of each secondary screw 49, the flange 47 of the base 25 comprises a cut 56 such that the head of each secondary screw 49 bears onto the flange 51 of the shield 50, and not on the flange 47 of the base 25. The secondary screws 49 are, for example, screws comprising a hexagonal head. The mistake proofing element can be produced by distributing the secondary screws 49 irregularly around the axis X. The mistake proofing element is thus formed by the different cuts 56 associated with the secondary screws 49. As an example, the secondary screws 49 can be placed at 5 o'clock, 7 o'clock and 12 o'clock, by analogy to the dial of a clock.

Figure 10:
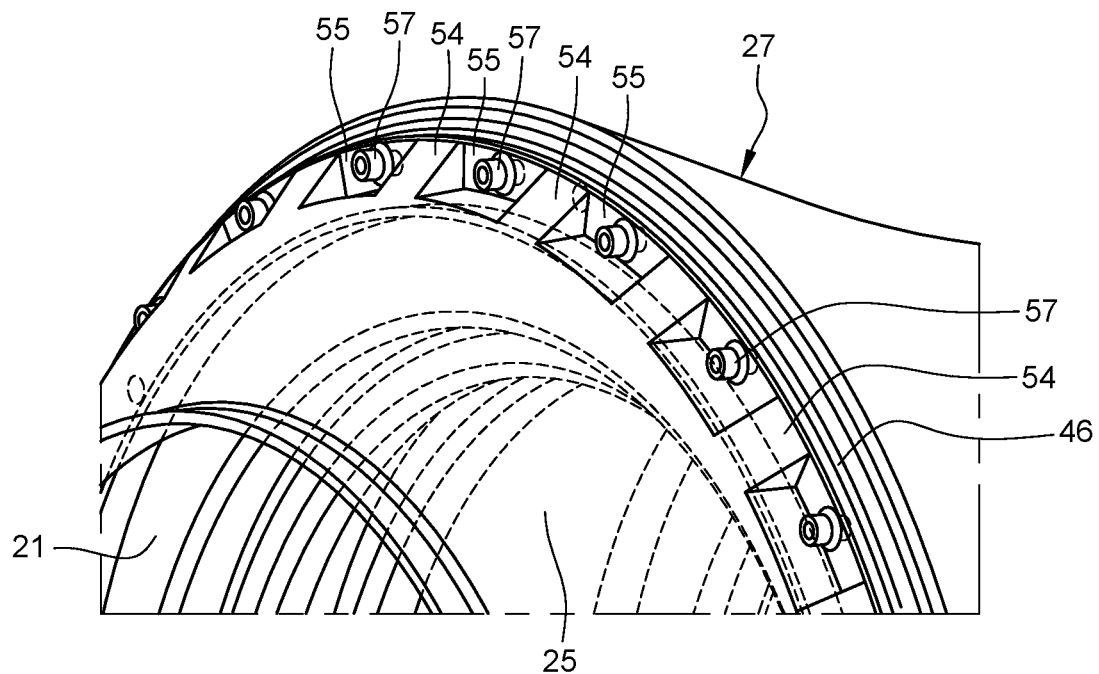
FIG. 10 is a perspective view of the assembly of a base and of a shell on a collar, according to another embodiment.
Figure 11:
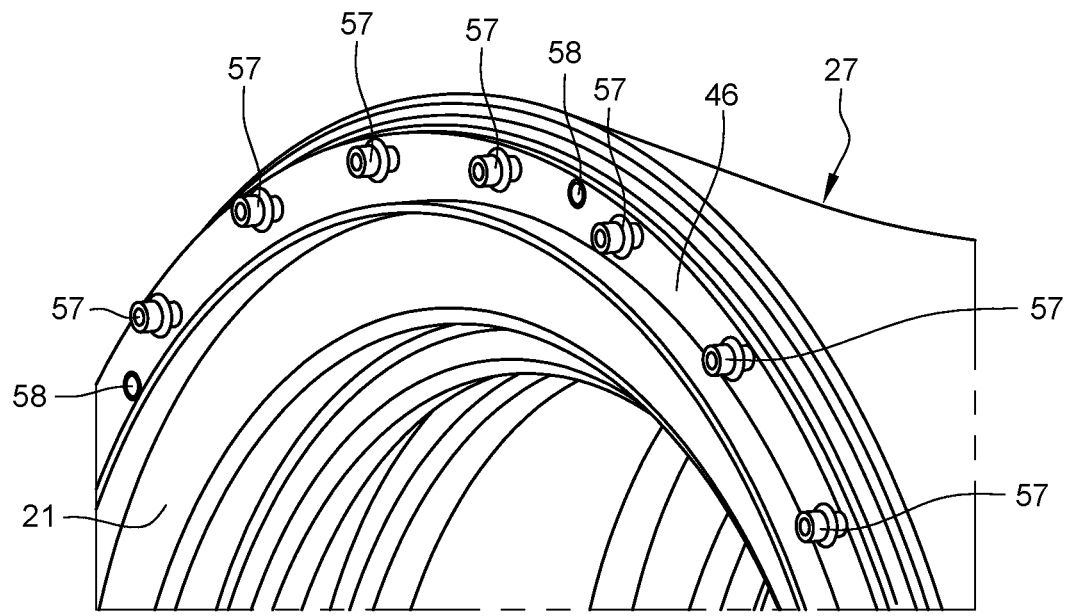
FIG. 11 corresponds to FIG. 10, the base having been concealed.

According to an embodiment variant illustrated in FIGS. 10 and 11, the primary screws 57 are distributed regularly around the axis X according to a constant angular step, for example 10 degrees. The heads of the secondary screws 58 here are buried in the flange 51 of the shield 50. Each of the secondary screws 58 is arranged angularly between two primary screws 57. The secondary screws 58 here are screws having a countersunk head. The mistake proofing element can be produced by positioning the head of one of the secondary screws 58 protruding with respect to the flange 51 of the shield 50. The mistake proofing element is thus formed by a recess made in the flange 47 of the base 25 and arranged opposite the protruding head.

According to the examples represented in FIGS. 3 and 7, the pipe 22 comprises an outer section 59 and an inner section 60. The outer section 59 comprises an outer nozzle 61 connected to a nozzle of a supply channel 62 and an inner nozzle 63 connected to an outer nozzle 64 of a connector 65. The connector 65 comprises a first lubricating spout 66 of the downstream bearing 16. The inner section 60 comprises an outer nozzle 67 connected to an inner nozzle 68 of the connector 65 and an inner nozzle 69 connected to a second lubricating spout 70 of the upstream bearing 15.

According to the examples represented in FIGS. 3 and 7, the pipe 22 is independent of the support 14, and in other words, the pipe 22 is formed of one or more parts separate from the part or parts forming the support 14.

More specifically, the outer section 59 is substantially parallel to the base 25. The inner section 60 is substantially parallel to the upstream branch 17. The outer nozzle 61 of the outer section 59 is a male nozzle housed in a female nozzle of the supply channel 62 placed between the shell 21 and the inner hub 27 of the inlet casing 28. The inner nozzle 63 of the outer section 59 is a male nozzle housed in a female outer nozzle 64 of the connector 65. The first lubricating spout 66 is arranged upstream of the downstream bearing 16. The outer nozzle 67 of the inner section 60 is a male nozzle housed in a female inner nozzle 68 of the connector 65. The inner nozzle 69 of the inner section 60 is a male nozzle housed in a downstream female nozzle of a passage 71 made in the upstream branch 17. The second lubricating spout 70 is arranged upstream of the upstream bearing 15 and comprises a male nozzle housed in a female nozzle upstream of the passage 71. The connector 65 substantially has a general T-shape. The connector 65 is a two-way connector equipped with a lubricating spout. Each male nozzle comprises an O-ring placed in a groove so as to seal the connection between a male nozzle and a female nozzle.

One single pipe 22 for conveying (outer section 59, connector 65, inner section 60) is represented in FIGS. 3 and 7. The lubrication means can, of course, comprise a plurality of pipes 22 distributed regularly or irregularly around the axis X, for example, three or four. Each pipe 22 is in particular associated with a passage 71, an opening 24, a space 52 and an orifice 23.

Figure 2:
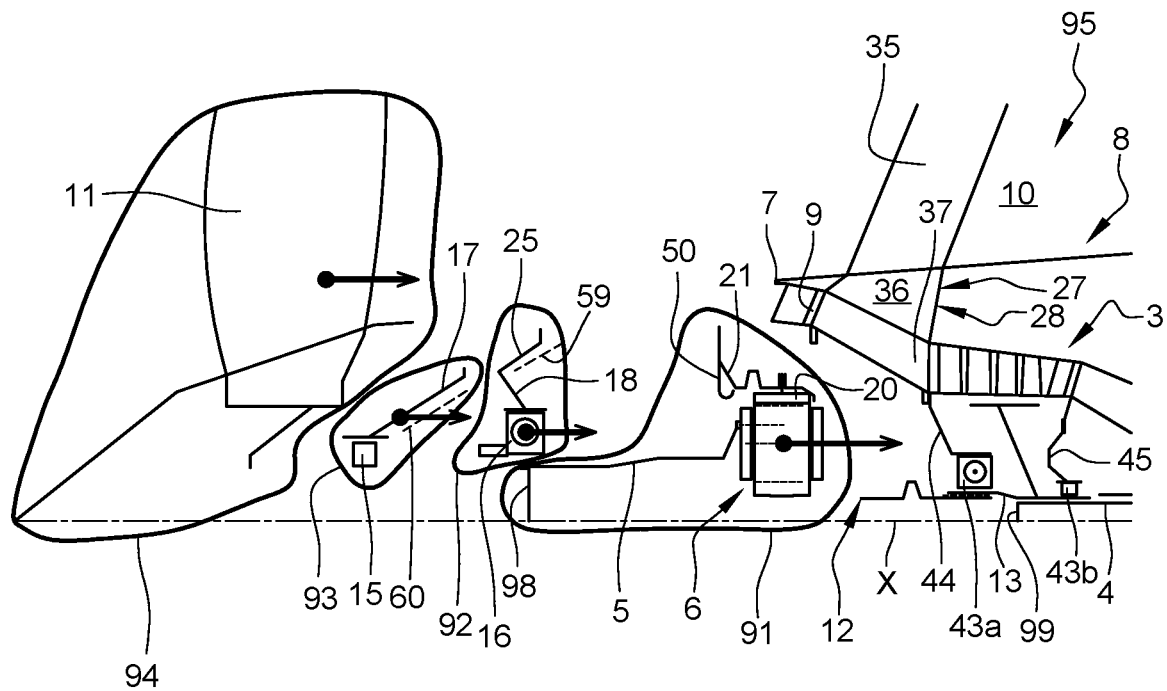
FIG. 2 is an exploded, schematic, axial half-cross-sectional view, illustrating the order of mounting modules (or subassemblies) of the turbine engine represented in FIG. 1.

According to the first embodiment illustrated in FIGS. 1 to 3, the downstream branch 18 of the support 14 is made integral with the base 25 of the support 14, and the upstream branch 17 is attached to the base 25.

More specifically, the upstream branch 17 comprises a flange 72 at an outer end, the flange 72 being centered and supported with respect to an inner end of the base 25. The flange 72 of the upstream branch 17 has a downstream face 73 supported on an upstream face 74 of the inner end of the base 25 and a centering face 75 inserted in an axial hole 76 made in the inner end of the base 25. The positioning of the flange 72 of the upstream branch 17 opposite the inner end of the base 25 (via a downstream face 73 and a centering face 75) is formed by a plane-supporting connection and a short centering. The flange 72 of the upstream branch 17 is held in position via a plurality of screws 77 distributed regularly around the axis X, each screw 77 simultaneously passing through a through hole 78 made in the flange 72 of the upstream branch 17 and a tapped hole 79 made in the inner end of the base 25. The screws 77 are, for example, screws having a hex cylindrical head. The flange 72 of the upstream branch 17 comprises an O-ring placed in a groove so as to seal the connection between the upstream branch 17 and the base 25.

The outer ring 30 of the upstream bearing 15 is stopped axially by a downstream shoulder 80 made in the outer ring 30. The inner ring 29 of the upstream bearing 15 is attached to the fan shaft 5 via an annular base 81 (centered on the axis X). The inner ring 29 is stopped axially by removable axial holding means 82 and a downstream shoulder 83 made in the base 81. The outer ring 33 of the downstream bearing 16 is stopped axially by an upstream shoulder 84 made in the downstream branch 18 and removable axial holding means 85. The inner ring 32 of the downstream bearing 16 is stopped axially by removable axial holding means 86 such as a nut and a downstream shoulder 87 made in the fan shaft 5.

The inner nozzle 68 of the connector 65 is inserted in an orifice of a pad 88 protruding radially inwards from the outer end of the upstream branch 17. The connector 65 is furthermore axially supported against the pad 88. The outer nozzle 64 of the connector 65 is partially inserted with clearance in the opening 24.

Figure 4:
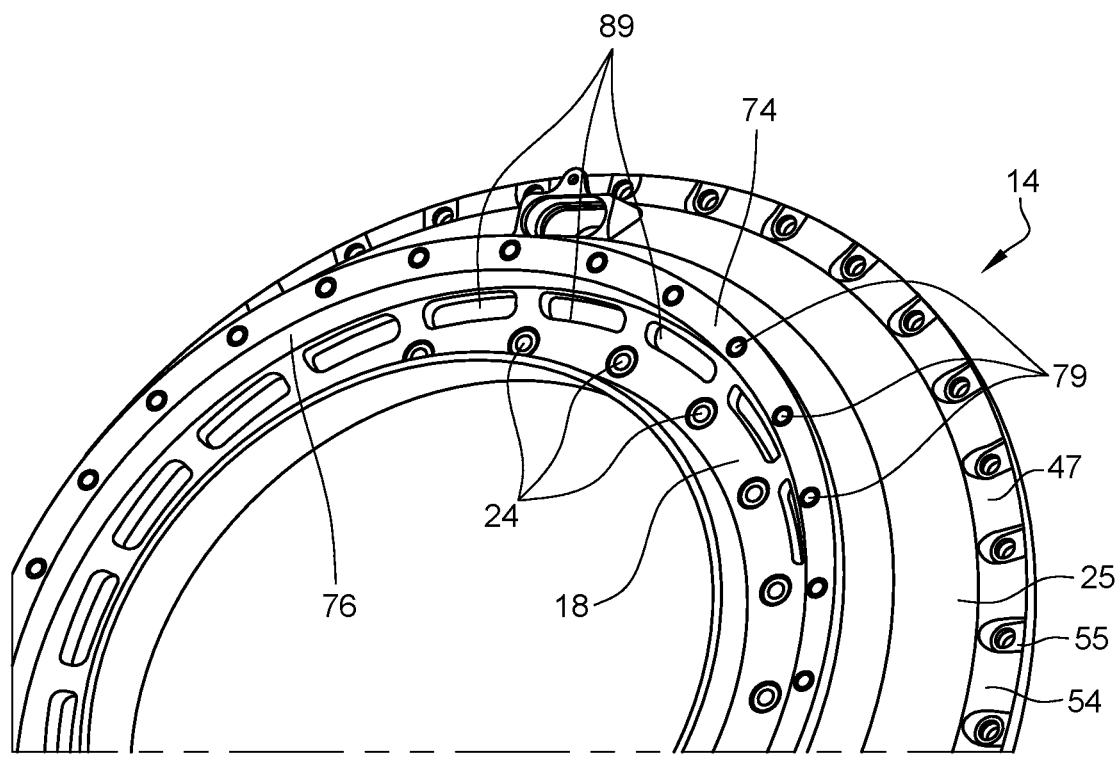
FIG. 4 is a detailed, perspective view of a base of a support of the turbine engine represented in FIG. 3.

As illustrated in FIG. 4, the support 14 comprises a plurality of ventilation openings 89 of the enclosure 19 made in the downstream branch 17, these openings 89 being distributed regularly around the axis X. The openings 89 are each configured to make it possible for the passage of an endoscope or a visual inspection of an operator so as to verify the passage of the pipe 22 in the space 52 and the orifice 23, as well as the interlocking of the outer nozzle 61 of the outer section 59 in the nozzle of the supply channel 62, during the mounting of the assembly comprising the base 25 and the downstream branch 18. Each opening 89 here has an oblong shape. The openings 89 make it possible, furthermore, to limit the mass of the support 14 and to ventilate the enclosure 19.

The first embodiment has the advantage of being able to mount/demount the assembly comprising the base 25 and the downstream branch 18 independently of the reduction gear 6. This technical feature is in particular advantageous during maintenance operations. The pre-mounting of the sections 59, 60 on each of the modules is easy and reliable. It is also possible to use different materials for the upstream branch 17 and the downstream branch 18.

Figure 5:
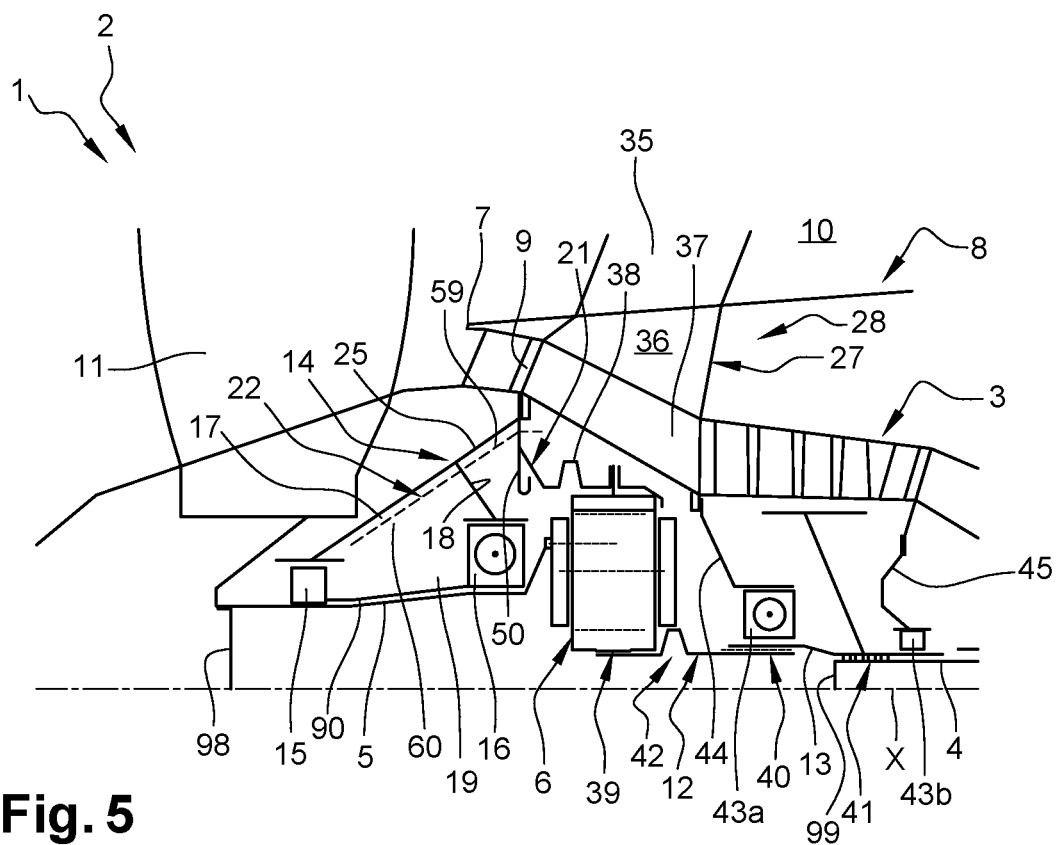
FIG. 5 is a schematic, axial half-cross-sectional view of an aircraft reduction gear turbine engine partially represented, according to a second embodiment.
Figure 6:
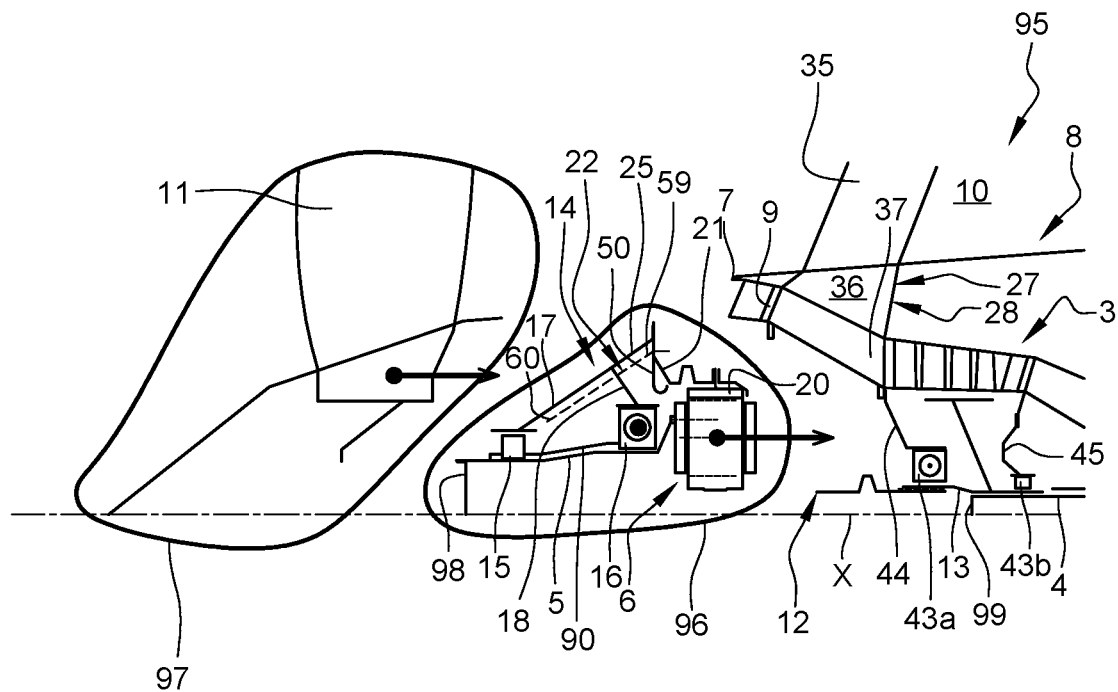
FIG. 6 is an exploded, schematic, axial half-cross-sectional view illustrating the order of mounting modules of the turbine engine represented in FIG. 5.

According to the second embodiment illustrated in FIGS. 5 to 7, the upstream and downstream branches 17, 18 are made integral with the base 25.

More specifically, the outer ring 30 of the upstream bearing 15 is stopped axially by a downstream shoulder 80 made in the outer ring 30. The inner ring 29 of the upstream bearing 15 is attached to the fan shaft 5 via an annular base 81 (centered on the axis X). The inner ring 29 is stopped axially by removable axial holding means 82 and an upstream end of an annular spacer 90 (centered on X). The outer ring 33 of the downstream bearing 16 is stopped axially by an upstream shoulder 84 made in the downstream branch 18 and removable axial holding means 85. The inner ring 32 of the downstream bearing 16 is stopped axially by a downstream end of the spacer 90 and a downstream shoulder 87 made in the fan shaft 5.

The outer nozzle 64 of the connector 65 is partially inserted in the opening 24, the outer nozzle 64 being mounted clamped in the opening 24.

The second embodiment has the advantage of having a support 14 having a low mass and optimised mechanical features, compared in particular with the first embodiment. The pre-mounting of the sections 59, 60 on the module is easy and reliable.

More specifically, the mounting of the turbine engine 1 is covered below in the description.

Now, FIG. 2 is referred to, which shows the order of mounting different modules (or subassemblies) of the turbine engine 1 according to the first embodiment represented in particular in FIGS. 1 to 3.

As illustrated in FIG. 2, the mounting method chronologically comprises steps of:

a) mounting, from upstream to downstream, a first module 91 on an assembly during mounting 95, the assembly during mounting 95 comprising at least the inlet casing 28 of the fixed structure 8 and the inlet shaft 12, the first module 91 comprising the speed reduction gear 6 on which have been pre-mounted the fan shaft 5 and the shell 21, b) mounting, from upstream to downstream, a second module 92 comprising the base 25 and the downstream branch 18 of the support 14 on which have been pre-mounted, the outer section 59 of the pipe 22 and the downstream bearing 16, c) mounting, from upstream to downstream, a third module 93 comprising the upstream branch 17 on which have been pre-mounted, the inner section 60 of the pipe 22 and the upstream bearing 15.

More specifically, the assembly during mounting 95 also comprises the upstream and downstream supports 44, 45, the upstream and downstream bearings 43a, 43b (or one single bearing), the LP compressor shaft 13, the LP turbine shaft 4.

The first module 91 also comprises the shield 50 pre-mounted on the shell 21.

More specifically, during step a), the sun gear of the reduction gear 6 is coupled in rotation with the inlet shaft 12, the secondary screws 49 are screwed in the collar 26.

During step b), the outer nozzle 61 of the outer section 59 is inserted in the space 52 and the orifice 23 before being housed in the nozzle of the supply channel 62, the primary screws 48 are screwed in the collar 26, the removable axial holding means 86 of the inner ring 32 of the downstream bearing 16 are implemented.

During step b), the operator uses the mistake proofing element to angularly place the base 25 and the downstream branch 18 such that the outer nozzle 61 of the outer section 59 is aligned with the space 52 of the shield 50 and the orifice 23 of the shell 21 so as to make it possible to insert the outer nozzle 61 in the space 52 and the orifice 23, as well as the interlocking of the outer nozzle 61 in the nozzle of the supply channel 62.

During step c), the inner nozzle 63 of the outer section 59 is inserted in the outer nozzle 64 of the connector 65, the screws 77 are screwed in the inner end of the base 25, the removable axial holding means 82 of the inner ring 29 of the upstream bearing 15 are implemented.

The method can comprise a step b1), chronologically following step b), in which an operator verifies, visually through the openings 89 or using an endoscope by inserting it in one of the openings 89, the passage of the outer nozzle 61 of the outer section 59 in the space 52 and the orifice 23, as well as the interlocking of the outer nozzle 61 of the outer section 59 in the nozzle of the supply channel 62.

The method can comprise a step d), chronologically following step c), wherein a fourth module 91 comprising at least the blades 11 of the fan 2 is mounted.

Referring now to FIG. 6, which shows the order of mounting of different modules (or subassemblies) of the turbine engine 1 according to the second embodiment represented, for example in FIGS. 5 to 7.

As illustrated in FIG. 6, the mounting method chronologically comprises a step of:

a) mounting, from upstream to downstream, a first module 96 on an assembly during mounting 95, the assembly during mounting 95 comprising at least the inlet casing 28 of the fixed structure 8 and the inlet shaft 12, the first module 96 comprising the speed reduction gear 6, the fan shaft 5, the shell 21, the support 14, the pipe 22 (inner and outer sections 59, 60, connector 65), the upstream bearing 15, the downstream bearing 16.

More specifically, the assembly during mounting 95 also comprises the upstream and downstream supports 44, 45, the upstream and downstream bearings 43a, 43b (or one single bearing), the LP compressor shaft 13, the LP turbine shaft 4.

More specifically, the first module 96 further comprises the shield 50, the spacer 90, the removable axial holding means 82 of the inner ring 29 of the upstream bearing 15.

More specifically, during step a), the sun gear of the reduction gear 6 is coupled in rotation with the inlet shaft 12, the primary and secondary screws 57, 58 are screwed in the collar 26.

In line with the embodiment variant illustrated in FIGS. 10 and 11, windows are provided in the flange 47 of the base 25 to make it possible to screw the secondary screws 58.

The method can comprise a step b), chronologically following step a), wherein a second module 97 comprising at least the blades 11 of the fan 2 is mounted.

It is noted, that whichever the embodiment, the flange 46 of the shell 21 is mounted shrunk (in other words, with a negative clearance) in the collar 26 of the inlet casing 28. Such a mounting is applied also to the connections between the shield 50 and the shell 21, the base 25 and the shield 50, the upstream branch 17 and the base 25 (first embodiment).

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the foregoing description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to directions, such as "forward," "rearward," "front," "back," "upward," "downward," "right hand," "left hand," "lateral,"

"medial," "in," "out," "extended," "advanced," "retracted," "proximal," "distal," "central," "upstream," downstream," etc. These references, and other similar references in the present application, are only to assist in helping describe and understand the particular embodiment and are not intended to limit the present disclosure to these directions or locations.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The term "about," "approximately," etc., means plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property of privilege is claimed are defined as follows:

1. A turbine engine comprising: a ducted fan comprising a first annular shaft supporting blades, said first annular shaft being driven in rotation via a speed reduction gear, said first annular shaft being guided in rotation with respect to an annular support of a fixed structure via an upstream bearing and a downstream bearing distant from one another and placed upstream of said speed reduction gear, said downstream bearing guiding in rotation said first annular shaft with respect to a downstream branch of said annular support, said first annular shaft and said annular support together defining an annular enclosure, said speed reduction gear comprising a ring gear fixed to said fixed structure via an annular shell, and said turbine engine further comprising lubrication means of said upstream and downstream bearings, said lubrication means comprising at least one pipe for conveying a liquid lubricant, wherein said pipe is located in said annular enclosure, said pipe passing through an orifice in said annular shell and an opening in said downstream branch.

2. The turbine engine according to claim 1, wherein said annular shell and said annular support each comprise an annular flange, said annular flange of said annular shell being arranged axially between said annular flange of said annular support and a collar of said fixed structure, the annular flange of said annular support being fixed to said collar via at least one primary screw, and said turbine engine further comprising at least one secondary screw configured to fix said flange of said annular shell to said collar independently of said annular support.

3. The turbine engine according to claim 2, wherein said fixed structure comprises an annular shield comprising a flange arranged axially between said flange of said annular support and said flange of said annular shell, said at least one secondary screw being configured to fix said flanges of said annular shield and of said annular shell to said collar independently of the annular support, said pipe passing through a space made in said shield, said space being arranged opposite said orifice.

4. The turbine engine according to claim 1, wherein said annular support comprises a mistake proofing element configured to angularly place said annular support such that the pipe is aligned with said orifice of said annular shell to permit insertion of the pipe in said orifice during the mounting of said annular support.

5. The turbine engine according claim 1, wherein said pipe comprises an outer section and an inner section, said outer section having an outer nozzle connected to a nozzle of a supply channel and an inner nozzle connected to an outer nozzle of a connector, said connector comprising a first lubricating spout of said downstream bearing, said inner section having an outer nozzle connected to an inner nozzle of said connector and an inner nozzle connected to a second lubricating spout of said upstream bearing.

6. The turbine engine according to claim 1, wherein said annular support comprises a base attached to said fixed structure, and an upstream branch and said downstream branch secured to said base, said upstream bearing guiding said first annular shaft with respect to said upstream branch of said annular support, said downstream branch being made integral with said base and said upstream branch being attached to said base.

7. The turbine engine according to claim 6, wherein said annular support comprises at least one ventilation opening of said annular enclosure made in said downstream branch, said at least one opening being configured for the passage of an endoscope or a visual inspection of an operator so as to verify the passage of said pipe in said orifice during the mounting of said annular support.

8. The turbine engine according to claim 1, wherein said annular support comprises a base attached to said fixed structure, and an upstream branch and said downstream branch secured to said base, said upstream bearing guiding said first annular shaft with respect to said upstream branch of said annular support, said upstream and downstream branches being made integral with said base.

9. The turbine engine according to claim 8, wherein said upstream and downstream bearings are rolling bearings each comprising an outer ring housed in said upstream branch or said downstream branch, an inner ring attached to said first annular shaft and rolling elements arranged between said inner and outer rings, said inner ring of the downstream bearing being stopped axially by a shoulder made in said first annular shaft and by an annular spacer arranged between said inner ring of the downstream bearing and said inner ring of the upstream bearing, said inner ring of the upstream bearing being stopped axially by said annular spacer and removable axial holding means.

10. A method for mounting a turbine engine, the turbine engine including a ducted fan comprising a first annular shaft supporting blades, said first annular shaft being driven in rotation via a speed reduction gear, said first annular shaft being guided in rotation with respect to an annular support of a fixed structure via an upstream bearing and a downstream bearing distant from one another and placed upstream of said speed reduction gear, said downstream bearing guiding in rotation said first annular shaft with respect to a downstream branch of said annular support, said first annular shaft and said annular support together defining an annular enclosure, said speed reduction gear comprising a ring gear fixed to said fixed structure via an annular shell, wherein said annular support comprises a base attached to said fixed structure, and an upstream branch and said downstream branch secured to said base, said upstream bearing guiding said first annular shaft with respect to said upstream branch of said annular support, said upstream and downstream branches being made integral with said base, and lubrication means associated with said upstream and downstream bearings, said lubrication means comprising at least one pipe for conveying a liquid lubricant, wherein said pipe is boated in said annular enclosure, said pipe passing through an orifice in said annular shell and an opening in said downstream branch, said pipe comprising an outer section and an inner section, said outer section having an outer nozzle connected to a nozzle of a supply channel and an inner nozzle connected to an outer nozzle of a connector, said connector comprising a first lubricating spout of said downstream bearing, said inner section having an outer nozzle connected to an inner nozzle of said connector and an inner nozzle connected to a second lubricating spout of said upstream bearing, the method comprising a step of:
mounting, from upstream to downstream, a first module on an assembly during mounting, said assembly during mounting comprising at least one casing of said fixed structure and a second shaft, said first module comprising said speed reduction gear, said first annular shaft, said annular shell, said annular support, said pipe, the upstream bearing and the downstream bearing.

11. A method for mounting a turbine engine, the turbine engine including a ducted fan comprising a first annular shaft supporting blades, said first annular shaft being driven in rotation via a speed reduction gear, said first annular shaft being guided in rotation with respect to an annular support of a fixed structure via an upstream bearing and a downstream bearing distant from one another and placed upstream of said speed reduction gear, said downstream bearing guiding in rotation said first annular shaft with respect to a downstream branch of said annular support, said first annular shaft and said annular support together defining an annular enclosure, said speed reduction gear comprising a ring gear fixed to said fixed structure via an annular shell, said annular support including a base attached to said fixed structure, and an upstream branch and said downstream branch secured to said base, said upstream bearing guiding said first annular shaft with respect to said upstream branch of said annular support, said downstream branch being made integral with said base and said upstream branch being attached to said base, and lubrication means associated with said upstream and downstream bearings, said lubrication means comprising at least one pipe for conveying a liquid lubricant, wherein said pipe is located in said annular enclosure, said pipe passing through an orifice in said annular shell and an opening in said downstream branch, said pipe including an outer section and an inner section, said outer section having an outer nozzle connected to a nozzle of a supply channel and an inner nozzle connected to an outer nozzle of a connector, said connector comprising a first lubricating spout of said downstream bearing, said inner section having an outer nozzle connected to an inner nozzle of said connector and an inner nozzle connected to a second lubricating spout of said upstream bearing, the method chronologically comprising steps of:

mounting, from upstream to downstream, a first module on an assembly during mounting, said assembly during mounting comprising at least one casing of said fixed structure and a second shaft, said first module comprising said speed reduction gear, on which have been pre-mounted, said first annular shaft and said annular shell, mounting, from upstream to downstream, a second module comprising said base and said downstream branch of said annular support, on which have been pre-mounted, said outer section of said pipe and the downstream bearing, and mounting, from upstream to downstream, a third module comprising said upstream branch, on which have been pre-mounted, the inner section of said pipe and the upstream bearing.

\* \* \* \* \*